Patented Apr. 8, 1947

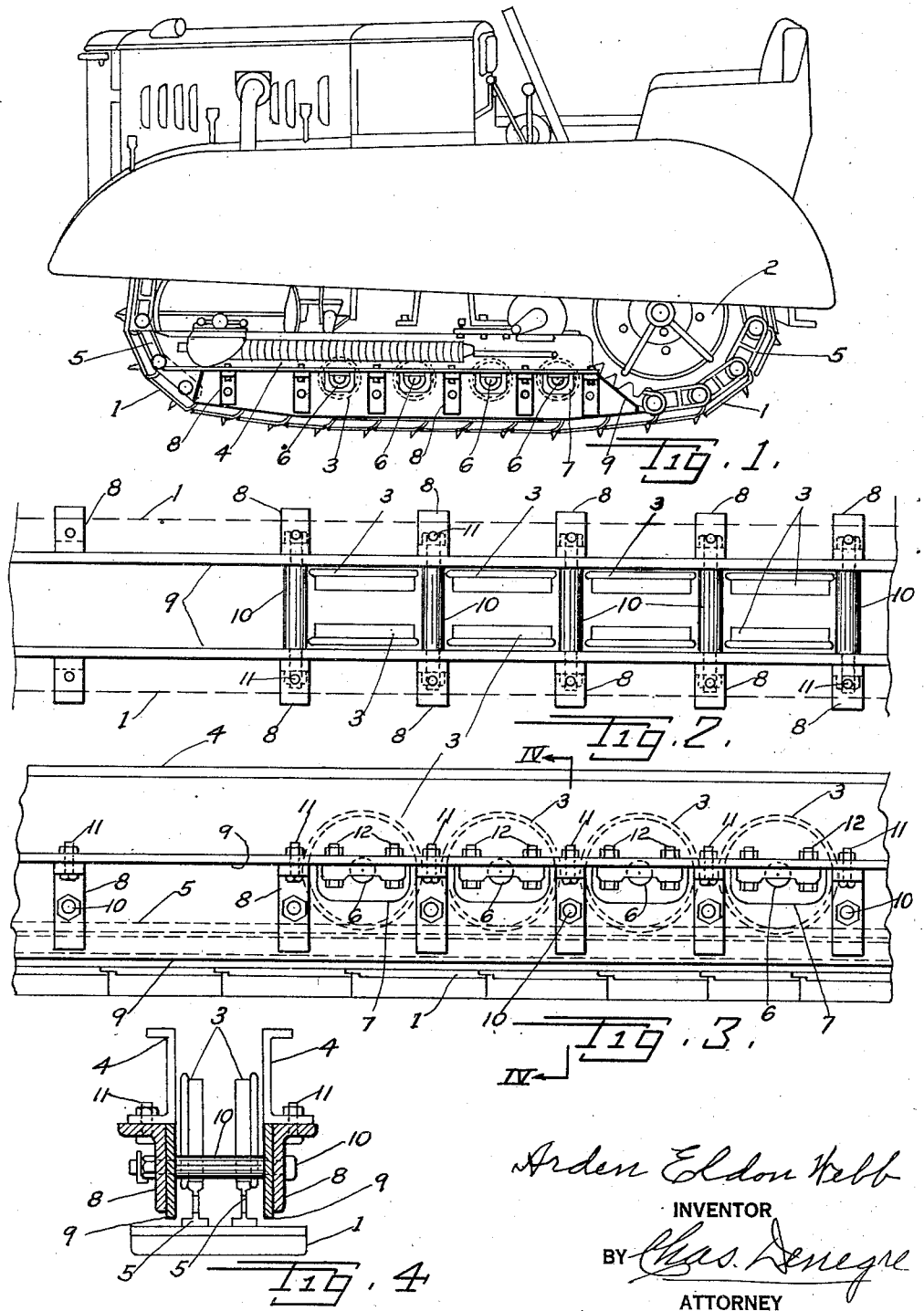

2,418,610

UNITED STATES PATENT OFFICE 2,418,610

TRACTOR TRACK GUARD

Arden Eldon Webb, Heflin, Ala.

Application December 20, 1943, Serial No. 514,873

1 Claim. (Cl. 305—9)

This invention relates to track-type tractors and has for its main object to provide an attachment or guard to keep the track from getting off the rollers, sprockets, and front idler, especially under rough going conditions that are often encountered in the use of the crawler track-type tractors. The present invention must not be confused with a mud guard. While it may keep some mud out of the mechanism it is not classed as a mud guard.

The present attachment is highly practical as well as efficient in that it bolts on to the roller frame, using the same holes as the mud guards but fits snugly beside the rollers and track rails, and also has bolts which extend from both sides in between each set of rollers to keep the guards from spreading. The guard extends from the roller frame down to within about half inch of the track shoes on each side of the track rails. This attachment being fastened to the roller frame in this way will positively keep the track on the rollers and sprockets regardless of the position of the tractor on any rough and tumble surface. It will also prolong the life of the rollers, and also prevent the track rails from getting off behind the roller flange and breaking it off; also keeps the track rails from riding the sprocket teeth and chipping off the corners.

By referring to the drawing, part of this application, it will be observed that Fig. 1 is a general side view of a track-type tractor showing the present attachment in heavy lines; Fig. 2 is a plan view showing the guard and rollers; Fig. 3 is a side view of the guard and manner of attaching; and Fig. 4 is a cross section of guard as mounted.

Similar reference numerals refer to similar parts throughout the several views.

Again referring to the drawing in detail it will be seen that the invention comprises a metal guard plate 9 that is carried on each side of the link-track 5 and held in place by angle supports 8 attached with bolts 11 to the roller frame 4. The guards are held firmly apart by means of stay cross bolts 10. The shoes 1 travel along on links 5 and over the main drive sprocket 2 and along on rollers 3 that straddle the link track 5. The rollers are carried on axles 6 that are held in place by bolts 12. Openings 7 are provided in the guard for inspection and oiling purposes. Because of the close proximity of the guards 9 to the link track 5 and the shoes 1 it is practically impossible for the rollers 3 to get off of the link track 5 when the tractor is in use.

While I have shown and described the preferred embodiment of my invention, I do not wish to limit myself to the exact and precise details of structure, but reserve the right to make all changes and modifications so long as I remain within the spirit and scope of the following claim.

Having described my invention I claim:

A device of the class described for keeping the tread of a tractor in operating position on its rails comprising; a plurality of L shaped brackets removably attached by bolt means to both sides of the lower portion of the frame of each tread of the tractor, spacer bolts removably attached through holes in the said brackets and positioned to hold the said brackets spaced apart and in alignment, an oblong metal plate removably attached on each side of the tractor tread and held and supported on said spacer bolts, said plates having their lower edges extending downward close to the bottom of the roller rails of the tractor tread.

ARDEN ELDON WEBB.

REFERENCES CITED

The following references are of record in the file of this patent:

UNITED STATES PATENTS

| Number | Name | Date |
|---|---|---|
| 1,294,200 | Tritton | Feb. 11, 1919 |
| 1,318,188 | Tritton | Oct. 7, 1919 |
| 1,338,059 | White | Apr. 27, 1930 |
| 1,325,220 | Washburn | Dec. 16, 1919 |